United States Patent Office 3,719,398
Patented Mar. 6, 1973

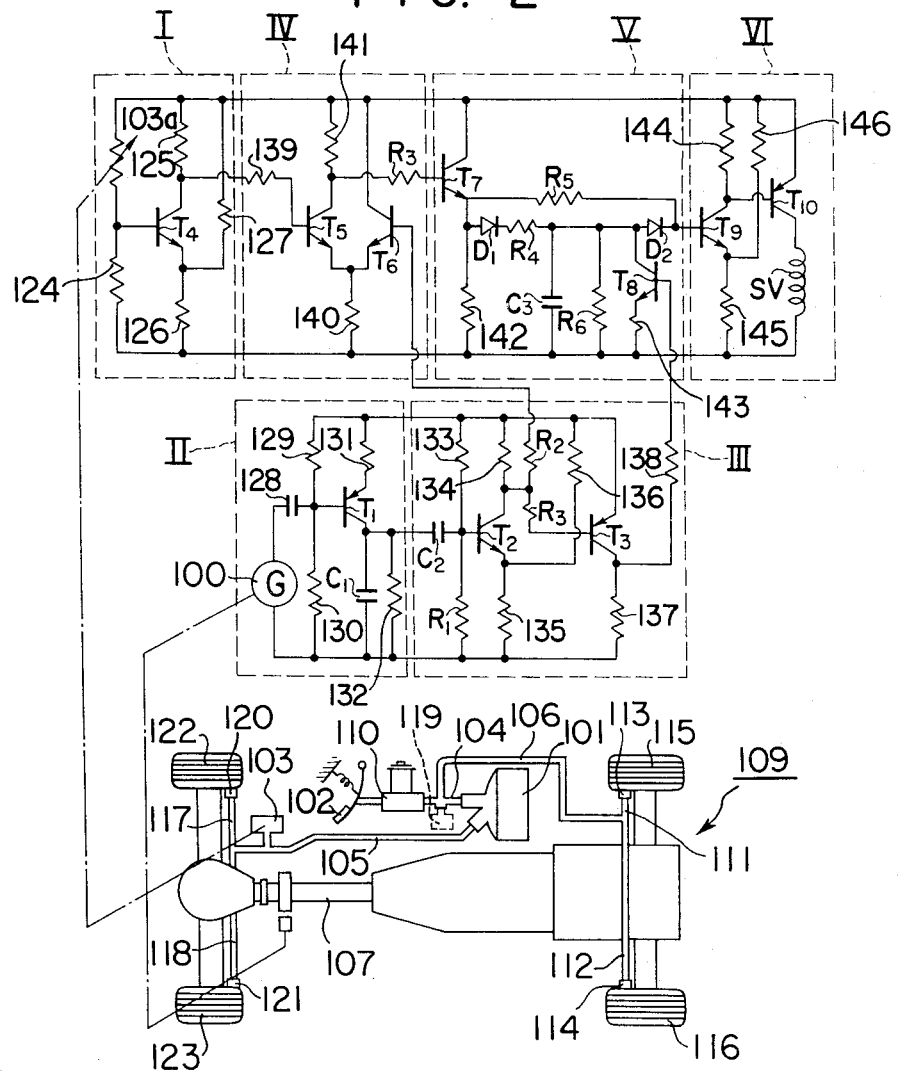
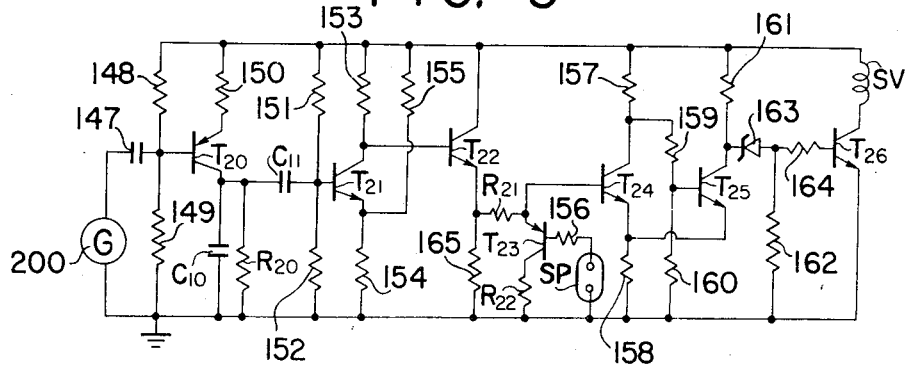

3,719,398
ANTISKID BRAKE CONTROL
Katuki Takayama and Koji Nishida, Kariya, and Hayao Yamazaki, Osaka, Japan, assignors to Aisin Seiki Kabushiki Kaisha, Kariya, Aichi Prefecture, and Sharp Corporation, Osaka, Japan
Filed Dec. 8, 1970, Ser. No. 96,208
Claims priority, application Japan, Dec. 9, 1969, 44/99,253
Int. Cl. B60f 8/08
U.S. Cl. 303—21 A                                    9 Claims

ABSTRACT OF THE DISCLOSURE

This invention relates to a method of and an apparatus for the control of antiskid hydraulic brake pressure by sensing both the hydraulic pressure being applied to wheel cylinder means of at least a vehicle wheel and the wheel angular rotational speed deceleration caused thereby in the wheel(s) for the purpose of sensing an impending wheel lock.

The improvement comprises a step for intentionally varying the sensitivity for sensing the wheel speed deceleration depending upon the applied hydraulic brake cylinder pressure.

---

This invention relates to a method of and an apparatus for the control of antiskid hydraulic brake pressure by sensing both the hydraulic pressure being applied to wheel cylinder means of at least one vehicle wheel and the wheel angular rotational speed deceleration caused thereby in the wheel(s) for the purpose of sensing an impending wheel lock.

A conventional antiskid brake controller has been designed to reduce the hydraulic brake force for avoiding a possible skid when an appreciable rotational speed difference is sensed among the vehicle wheels. A significant drawback encountered in this system occurs when all the wheels have been brought into a locked condition, the desired wheel lock detection becoming impossible because there is no discriminating means for showing speed difference among the wheels to rely upon.

A further system for control of the hydraulic brake pressure has been designed such that when an appreciable wheel deceleration is detected, the brake pressure is intentionally subjected to a reduction. An appreciable drawback encountered with this kind of hydraulic brake pressure control occurs when the brake pressure is reduced where the rotational speed of the wheel has not yet attained a predetermined pressure-reducing level, the wheel will lock and a vehicle skid phenomenon could be disadvantageously encountered.

The object of the invention is to provide an effective and reliable method and an apparatus for the control of antiskid hydraulic brake pressure, capable of obviating the aforementioned conventional drawbacks.

These and further objects, features and advantages of the invention will become more apparent when read in the following detailed description of the invention by reference to the accompanying drawings, in which:

FIG. 2 is a circuit diagram showing a preferred first embodiment of the invention, together with a schematic representation of an automotive vehicle.

FIG. 3 is a circuit diagram showing a second embodiment of the invention.

Figure 1:
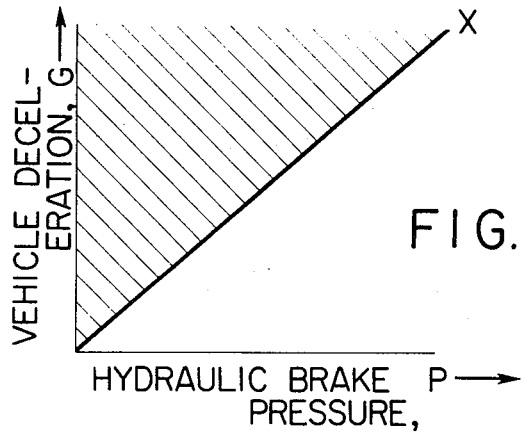
FIG. 1 is a conventional G-P diagram showing the relationship between vehicle deceleration degree expressed by G and hydraulic brake pressure expressed by P.

In advance of disclosing a detailed description of two preferred embodiments adapted for carrying out the method according to this invention, a general concept of the relationship between the vehicle deceleration degree and the hydraulic brake pressure appearing in the conventional automotive hydraulic brake system will be given as a preferable preparatory description by reference to FIG. 1.

When a braking pressure is applied to automotive vehicle wheel(s) for deceleration of the speed of a travelling vehicle, the braking torque appearing between the wheel tire and the travelling surface is in proportion to the hydraulic brake pressure prevailing in the hydraulic brake system, although certain modifications may occur depending upon various other conditions such as the load imposed on the wheel, the slope of the travelling surface or the like. This relationship is shown only in its principle in FIG. 1 by a linear curve X. As may be well supposed from FIG. 1, the relationship under consideration is substantially constant irrespective of values of mu which represents the adhesive coefficient between the tire and the traffic surface. From the representation of FIG. 1, it will be further seen that the braking operation is frequently carried out in such a way that with a certain amount of hydraulic braking pressure applied onto the vehicle wheel, a larger angular deceleration occurs in the wheel rotation than the corresponding value of vehicle deceleration, which means a braking action directing towards a wheel lock. When the wheel is decelerated within the shaded area shown in FIG. 1, such a wheel-locking brake condition occurs.

This invention has its object in principle to prevent a wheel lock by sensing hydraulic brake pressure applied to the wheel brake cylinder and wheel angular deceleration, so as to detect the degree of impending wheel lock by utilizing the unbalance between the both sensed values as a reliable measure.

Next, referring to FIG. 2, the first embodiment of the apparatus adapted for carrying out the control method according to the invention will now be described hereinbelow in detail.

In this figure, numeral 100 represents an A.C. generator only schematically shown by a small circle enclosing a character "G" which is an abreviation of "generator." Although not specifically shown, this alternator 100 has its rotor mechanically coupled with the conventional drive shaft 107, while its stator is mounted on a certain part of the chassis, not shown, of an automotive vehicle generally shown at 109 in FIG. 2. The generator senses the mean rotational speed of the rear wheels. Numeral 101 represents a conventional hydraulic pressure-reducer controlled by a conventional electromagnetic valve of which its energizing solenoid SV is shown in the upper part of FIG. 2. Numeral 102 represents a conventional foot-operated brake pedal. Numeral 103 shows a conventional hydraulic pressure sensor. Numeral 110 represents a conventional master cylinder. 104–106 are connection pipings connecting several of the aforementioned elements as shown.

When the brake pedal 102 is depressed intentionally by the driver of the vehicle, the manual braking effort is converted in the master cylinder 110 into a corresponding, but increased hydraulic pressure, as is well known.

This boosted-up hydraulic pressure will be conveyed from the master cylinder through pipings 106, 111 and 112 to the respective wheel brake cylinders 113 and 114 of automotive wheels 115 and 116.

Pressure reducer 101 is normally connected directly to the output of master cylinder 110 and the inputs of wheel cylinders 113 and 114, so far as the valve solenoid SV is de-energized. Hydraulic pressure sensor 103 is so designed and arranged that it represents an electric resistance responsive to the hydraulic pressure supplied through pipings 105, 117 and 118 to conventional wheel brake cylinders 120 and 121 of automotive rear wheels 122 and 123. In the similar way, pressure sensor 119 is so designed and arranged that it represents an electric resistance in response to the hydraulic pressure supplied through pipings 106, 111 and 112 to wheel cylinders 113 and 114 of automotive front wheels 115 and 116.

It may be thus well understood that the larger the hydraulic pressures supplied to the wheel cylinder pair 113, 114, or 120, 121, the higher will be the electric resistance appearing in the pressure sensor 119 or 103.

The electric circuit shown in FIG. 2 comprises a hydraulic pressure sensor section I, a wheel rotational speed sensor section II, a wheel deceleration and acceleration sensor section III, a comparator section IV adapted for comparing a hydraulic pressure-responsive signal with a wheel angular speed deceleration signal supplied thereto, a pressure reducing period setter section V and an electromagnetic valve driver section VI.

In the following, these circuit sections I-VI will be described in detail.

Hydraulic pressure sensor section I

In this section I, variable resistor 103a contained in the pressure sensor 103, several fixed resistors 124–127 and a transistor T4 are provided and electrically connected with each other as shown. Thus, a voltage responsive to the hydraulic brake pressure is conveyed to transistor T4 and amplified therein. The thus amplified, brake pressure-responsive voltage signal is fed to transistor T5 included in the comparator section IV.

Wheel revolutional speed sensor section II

This section II contains said alternator 100, transistor T1, condensers 128 and C1 and fixed resistors 129–132 which are electrically connected as shown.

Alternating output from the generator 100 is subjected to switching control by the transistor T1 and a voltage responsive to the wheel rotational speed in the condenser C1.

Wheel angular speed deceleration and acceleration sensor section III

This section III contains condenser C2, transistors T2 and T3, fixed resistors R1–R3 and 134–138 which are electrically connected with each other as shown.

Voltage in the condenser C1 is fed to a differentiating circuit consisting of condenser C2 and resistor R1 so as to provide a voltage signal responsive to the occasional wheel speed deceleration or acceleration, as the case may be. The output from the differentiating circuit is amplified at the transistor T2. Part of the output from the latter is fed from resistor R2 to a transistor T6 contained in the comparator section IV. Part of the output from transistor T2 is applied to transistor T3, so as to be subjected to phase reversal and fed to the base of a transistor T8 contained in the section V. The higher acceleration degree, the more conductive will be the transistor T8. In this way, the accumulated voltage on condenser C3 will be discharged in response to the acceleration.

Comparator section IV

This section IV contains transistors T5 and T6 and several fixed resistors R3 and 139–141 which are electrically connected as shown.

Transistors T5 and T6 are arranged to constitute in combination a differential amplifier with the voltage inputs responsive to said hydraulic brake pressure and said wheel speed deceleration, respectively, and a differential output between the both is delivered therefrom. The amplified differential output is conveyed through resistor R3 to the base of a transistor T7 which is contained in the section V, the output therefrom being further conveyed to the base of a transistor T9 contained in the section VI.

Pressure-reducing period setting circuit section V

This section V contains transistors T7 and T8, diodes D1 and D2, condenser C3, and fixed resistors R4–R6, 142 and 143 which are electrically connected as shown.

Output from transistor T4 is amplified at the transistor T7; part of the output therefrom is conveyed through diode D1 and resistor R4 to condenser C3, so as to be accumulated therein. This accumulated voltage is a measure to know a relative drop of the wheel rotational speed from the vehicle speed. Part of the output from transistor T7 is conveyed through resistor R5 to the base of transistor T9 contained in the circuit section VI. As shown, transistor T8 is arranged in parallel to resistor R6, the equivalent resistance of the last-mentioned transistor T8 being variable with the acceleration voltage supplied from the circuit section III.

The method for sensing the degree of drop of wheel rotational speed relative to the vehicle speed will be more specifically described hereinbelow.

Figure 4:
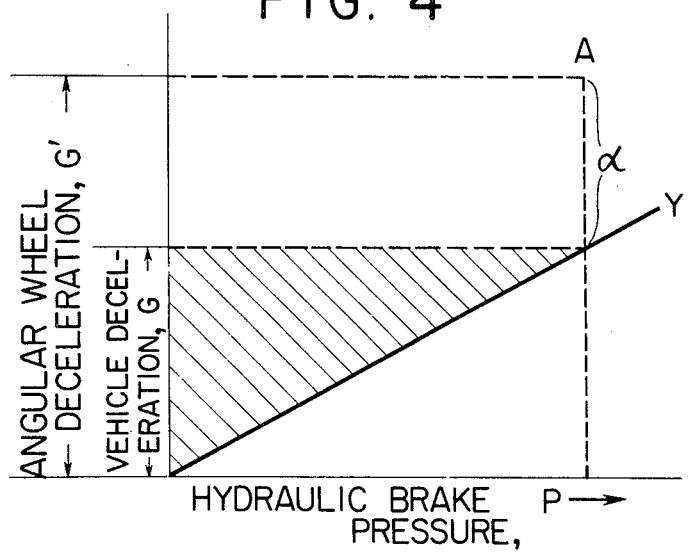
FIG. 4 is a G-P diagram showing the relationship among vehicle deceleration degree G, wheel angular deceleration G' and hydraulic brake pressure P.

Now referring to FIG. 4, G represents the vehicle deceleration; G' the wheel angular speed deceleration and P the hydraulic brake pressure. The linear curve Y shows the relationship referred to above.

It will be seen from this figure that the hydraulic brake pressure P is in proportion to the vehicle deceleration G. When there is a difference between the wheel angular deceleration G' and the vehicle deceleration G and the former becomes larger than the latter, the wheel is being braked towards its locked state. Thus, by integrating the difference between the hydraulic pressure and the wheel angular deceleration G' relative to time, the degree of drop of the wheel speed behind the vehicle speed can be determined. At a certain point A shown in FIG. 4, there exists a certain wheel retardation. It is only necessary to integrate the shown value alpha relative to time for the determination of instantaneous down-value of the wheel deceleration relative to the vehicle speed.

Valve drive circuits section VI

The circuit section VI contains transistors T9 and T10, fixed resistors 144–146 and solenoid coil SW for the control of the aforementioned electromagnetic valve. These transistors T9 and T10 are arranged to perform a switching operation depending upon the input to this section VI supplied from the foregoing section V. These transistors are so arranged that when the wheel deceleration-responsive voltage becomes larger than the hydraulic pressure-responsive voltage, they turn on.

The operation of the first embodiment so far shown and described is as follows:

When the wheel angular speed deceleration for a certain hydraulic brake pressure P enters into the shaded area shown in FIG. 1, there appears naturally a difference between the pressure-responsive voltage and the deceleration-responsive voltage. Should this difference become larger than a predetermined value, transistors T9 and T10 will become conductive and current will flow through solenoid SV. By this energization of this solenoid, pressure-reducing unit 101 is caused to actuate so that master cylinder 110 and rear wheel cylinders 120 and 121 will be interrupted from each other and the hydraulic cylinder pressure for the rear wheels is subjected to reduction or under occasions released.

With the wheel cylinder pressure released, the wheel is subjected to acceleration until its speed reaches the vehicle speed. The degree of acceleration realizable to the vehicle speed depends upon the adhesive coefficient mu appearing between the wheel tire and the traffic surface. With larger value of the adhesive coefficient, the realizable acceleration will become correspondingly higher, and vice versa.

When the wheel is under acceleration, the output from transistor T7 will become smaller correspondingly. Since, however, there is an accumulated quantity of wheel deceleration voltage in the condenser C3, these transistors will maintain their conducting state.

With large acceleration obtained during this period, the equivalent resistance of the transistor T8 will become correspondingly smaller and the voltage in condenser C3 will be discharged sooner, thus the conducting period of the transistors being correspondingly longer.

In the embodiment so far shown and described, the pressure sensor unit 103 is provided at the wheel cylinder side. But the sensor unit may be provided at the master cylinder side as shown by dotted lines at 119. This modified arrangement will be highly favorable when it is intended to compare the highest value of hydraulic brake pressure with the wheel deceleration.

The second embodiment of the invention is shown in FIG. 3.

In this embodiment, a hydraulic pressure switch SP is provided in place of the foregoing pressure sensor unit 103 or 119, so as to sense the hydraulic pressure in a stepped manner for more effectively sensing an impending wheel lock.

In this respect, it should be noted that in the conventional wheel-deceleration type anti-skid hydraulic braking system, it was impossible to sense effectively impending wheel locks. In fact, the wheel-locked period will become substantially small when the adhesion coefficient between the wheel tire and the traffic surface is large and the degree of skid is relatively small, while for smaller values of the coefficient and with the wheel brought into its locked state with the same degree of wheel angular speed deceleration G, the lock period will become correspondingly longer and the skid is very intense. It will be easily understood from the foregoing observation that the degree of wheel lock appearing with higher values of said coefficient may be of no importance when comparing with that appearing at lower values of the same coefficient. It can be seen that by managing with the wheel lock for lower values of the vehicle deceleration or for lower values of the hydraulic brake pressure, substantially satisfactory results may be obtained for the kind of hydraulic wheel braking system of the kind above referred to.

Figure 5:
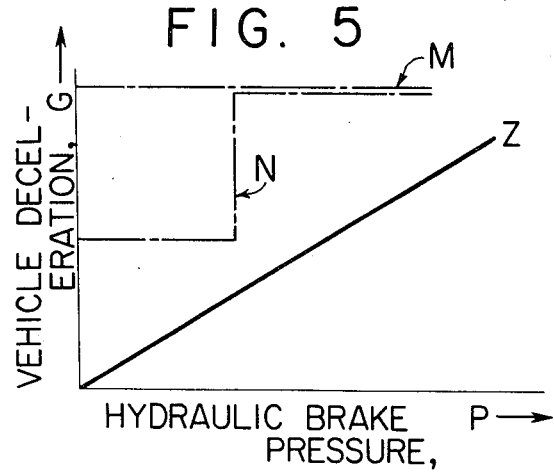
FIG. 5 is a comparative G-P diagram, showing a remarkable difference between the sensing level according to prior art and that when employing the novel teaching of the invention.

FIG. 5 represents a similar G-P curve Z for a comparative explanation of the prior art braking pressure control with the system of the present invention. In the comparative antiskid brake pressure control, a constant deceleration sensing level was always provided, irrespective of the hydraulic brake pressure. In the range of lower hydraulic brake pressure corresponding to a lower range of the adhesion coefficient mu, the range of wheel lock is naturally of a broad one. Thus, frequent wheel locks could be encountered for lower values of the coefficient. According to the novel teaching of the invention, however, the wheel lock sensing level is stepwise lowered for lower values of the hydraulic brake pressure, so as to improve the sensitivity and the sensing level is restored to the conventionally employed one with the lower hydraulic pressure values below a predetermined value. In this way, otherwise frequently encountered wheel locks for lower values of the coefficient mu can be substantially avoided with amazing results.

With an intentional increase of the number of the stepwise lowered sensing levels, the wheel lock can substantially be suppressed to a possible minimum. In FIG. 5, $m$ denotes a conventionally employed sensing level of the aforementioned sense, while $n$ represents a lowered sensing level employed in the inventive method, shown only by way of example.

Next, the second embodiment shown in FIG. 3 will be described in detail hereinbelow.

Alternator 200 is a similar one shown at 100 in FIG. 2, which is adapted for sensing the mean rotational speed of the rear wheels such as 122 and 123 shown therein. The hydraulic pressure system may be similar to that shown in FIG. 2.

In the present embodiment, hydraulic pressure switch SP is provided in place of that shown in FIG. 2 at 103, as was already referred to. This switch SP has been designed to switch when the hydraulic pressure becomes higher than a predetermined value such as 20 kg./cm.$^2$. Alternating voltage output from alternator 200 responsive to the automotive drive shaft 107 is conveyed to transistor T20 cooperating with condenser C10. The output from the transistor is conveyed to a differentiating circuit comprising condenser C11 and resistor 20 and the thus sensed wheel speed-responsive voltage is amplified at transistor T21. The amplified voltage output is applied to the input of a Schmitt trigger comprising transistors T24 and T25.

Transistor T24 is normally off, while transistor T25 is normally on. With off-state of transistor T25, transistor T26 is on, so as to provide current to solenoid SV so that the pressure reducer unit referred to is brought into actuation for performing the pressure-reducing job.

Transistor T23 is arranged to control the working point of the Schmitt circuit, one side of said switch SP being electrically connected to the base of transistor T23, while the opposite end of the switch is grounded. With lower hydraulic pressure than 20 kg./cm.$^2$, switch SP is kept in its open state and the transistor T23 is non-conductive. On the other hand, when the hydraulic pressure is higher than 20 kg./cm.$^2$, switch SP is brought into its closed position and the transistor T23 become conductive.

Various minor circuit components 147–165 are also included in this circuit, but they do not affect in a substantial way the operational mode of this circuit to be described.

When the sensed wheel deceleration by the combination of condenser C11 and R20 exceeds a predetermined value, the Schmitt circuit is brought into its state so that transistor T24 will become conductive and transistor T25 will turn off, thereby the collector potential at transistor T25 being elevated and transistor T26 becoming conductive so as to supply a current through solenoid SV for actuation of pressure reducer 101 (FIG. 2) in the releasing direction of the wheel cylinders 120 and 121 of rear wheels 122 and 123.

With increase of the hydraulic pressure, resulting in a corresponding decrease or deceleration of the rear wheel revolutional speed and under the pressure values lower than 20 kg./cm.$^2$, output from transistor T22 will be conveyed through resistor R21 to the base of transistor T24, on account of off-condition of transistor T23 and of a high equivalent resistance at transistor thereof with the switch SP kept in its non-conducting state and without decrease of the output voltage from transistor T22. With the switch SP closed and thus with smaller value of equivalent resistance at the transistor T23, the base voltage at transistor T24 will become small. Therefore, it will be seen from the foregoing that the sensitivity will become lower with the switch SP kept in its closed state, and vice versa.

With the hydraulic pressure elevated beyond the predetermined value, transistor T23 will become conductive and the voltage impressed upon the base of transistor T24 will become lower for the similar degree of wheel deceleration, thus the Schmitt circuit becomes rather difficult to switch. With less hydraulic pressure than the prescribed value, and the deceleration takes place within the range of the shaded area shown in FIG. 1, the conventionally employed sensing level is adjusted so as to provide a greater sensing degree for the purpose of prevention of the otherwise frequently encountered wheel locks on a traffic surface having a rather low value of adhesive coefficient mu. During the braking period wherein the hydraulic pressure exceeds the prescribed value, the sensitivity is set to a rather difficult range.

Since the invention provides the aforementioned operational control mode, the impending wheel skid condition of the vehicle is sensed when the wheel angular rotational speed exceeds a predetermined value for a degree of hydraulic brake pressure being applied to the vehicle wheel. The sensing of possible wheel lock is easier and more positive than the case of a conventional brake pressure control method. For lower hydraulic brake pressure, however, the sensing level is stepwise and intentionally lowered for lower brake pressure being applied to the wheel, so as to provide a higher sensitivity for avoiding otherwise possible wheel locks in the case of lower mu values.

The embodiments of the invention in which an exclusive property or privilege is claimed are as follows:

1. A method for controlling brake pressure in an anti-skid brake pressure control system comprising the following steps:
   (a) sensing a signal proportional to the speed of a wheel of a vehicle;
   (b) generating from said wheel speed signal a signal proportional to the angular deceleration or acceleration of the vehicle wheel;
   (c) sensing a signal proportional to the hydraulic brake pressure of the vehicle brake system;
   (d) generating a function signal which is a function of said hydraulic brake pressure signal;
   (e) generating a brake pressure control signal when said wheel angular deceleration or acceleration signal is greater than said function signal; and
   (f) controlling the brake pressure in said vehicle brake system in response to said control signal.

2. The method as set forth in claim 1, wherein said function signal is said hydraulic pressure signal per se.

3. The method as set forth in claim 1, wherein said function signal is a step function responsive to said hydraulic brake pressure signal.

4. The method as set forth in claim 1, further comprising:
   (a) storing a voltage as a function of the difference of said angular deceleration or acceleration signal and said function signal when said angular deceleration or acceleration signal is greater than said function signal; and
   (b) reducing the stored voltage as a function of said angular deceleration or acceleration signal wherein the time for reducing said stored voltage controls the period of said control signal whereby the period of brake pressure reduction is controlled.

5. An apparatus for controlling the brake pressure in an anti-skid brake pressure control system comprising:
   (a) first circuit means for sensing said brake pressure and for generating a function signal which is a function of said brake pressure;
   (b) second circuit means for generating a wheel speed signal proportional to the speed of a wheel of a vehicle;
   (c) third circuit means, coupled to said second circuit means, for generating a deceleration or acceleration signal proportional to the angular deceleration or acceleration of said wheel;
   (d) fourth circuit means, coupled to said first and third circuit means, for comparing said deceleration or acceleration signal to said function signal and for generating a signal when said deceleration or acceleration signal is larger than said function signal;
   (e) fifth circuit means for receiving the output of said fourth circuit means and for generating a control signal when said fourth circuit means generates a signal; and
   (f) control means, coupled to said fifth circuit means, for receiving said control signal and for controlling said brake system in accordance therewith.

6. The apparatus as set forth in claim 5 wherein said function signal is proportional to said brake pressure per se.

7. The apparatus as set forth in claim 6 wherein said first circuit means comprises a variable resistor, the resistance of said variable resistor varying in proportion to said brake pressure.

8. The apparatus as set forth in claim 5 wherein said fifth circuit means includes a charging circuit means for charging as a function of the output of said fourth circuit means and for discharging as a function of said wheel deceleration or acceleration signal said charging circuit means controlling the operation time of said control means.

9. The apparatus as set forth in claim 5 wherein said first circuit means comprises a switch means, said switch means changing states in accordance with said brake pressure wherein said function signal varies in accordance with the state of said switch means.

References Cited

UNITED STATES PATENTS

| | | | |
|---|---|---|---|
| 3,433,536 | 3/1969 | Skinner | 188—181 C |
| 3,469,662 | 9/1969 | Dewar | 303—21 CG |
| 3,552,803 | 1/1971 | Lucien | 303—21 BE |
| 3,584,921 | 6/1971 | Crawford | 303—21 BE |
| 3,615,120 | 10/1971 | Yamazaki et al. | 303—21 BE |

GERALD M. FORLENZA, Primary Examiner

R. JOHNSON, Assistant Examiner

U.S. Cl. X.R.

188—181 A; 303—21 CG